US009447596B2

(12) United States Patent
Ichikawa et al.

(10) Patent No.: US 9,447,596 B2
(45) Date of Patent: Sep. 20, 2016

(54) AXIALLY YIELDING ELASTO-PLASTIC HYSTERESIS BRACE AND VIBRATION-DAMPING STEEL-FRAME STRUCTURE

(71) Applicant: NIPPON STEEL & SUMIKIN ENGINEERING CO., LTD., Tokyo (JP)

(72) Inventors: Yasushi Ichikawa, Tokyo (JP); Kohji Nishimoto, Tokyo (JP)

(73) Assignee: NIPPON STEEL & SUMIKIN ENGINEERING CO., LTD., Tokyo (JP)

( * ) Notice: Subject to any disclaimer, the term of this patent is extended or adjusted under 35 U.S.C. 154(b) by 0 days.

(21) Appl. No.: 14/418,123

(22) PCT Filed: Mar. 21, 2013

(86) PCT No.: PCT/JP2013/058114
§ 371 (c)(1),
(2) Date: Jan. 29, 2015

(87) PCT Pub. No.: WO2014/020938
PCT Pub. Date: Feb. 6, 2014

(65) Prior Publication Data
US 2015/0284971 A1    Oct. 8, 2015

(30) Foreign Application Priority Data

Aug. 3, 2012   (JP) ................. 2012-173203

(51) Int. Cl.
*E04H 9/02*    (2006.01)
*F16F 15/02*   (2006.01)
*E04B 1/98*    (2006.01)

(52) U.S. Cl.
CPC ............... *E04H 9/021* (2013.01); *E04H 9/02* (2013.01); *F16F 15/022* (2013.01); *E04B 1/98* (2013.01); *E04H 9/028* (2013.01)

(58) Field of Classification Search
CPC .......... E04H 9/021; E04H 9/02; E04H 9/028; F16F 15/022; E04B 1/98; E04C 2003/026
USPC ................................ 52/167.3, 837
See application file for complete search history.

(56) References Cited

U.S. PATENT DOCUMENTS 5,471,810 A  * 12/1995 Sugisawa et al. ............. 52/836
6,012,256 A  *  1/2000 Aschheim ................. E04B 1/24
                                                    52/167.1

(Continued)

FOREIGN PATENT DOCUMENTS

CN    201078036    6/2008
CN    101718123    6/2010

(Continued)

OTHER PUBLICATIONS

International Search Report dated Jun. 4, 2013 issued in corresponding PCT Application No. PCT/JP2013/058114.

(Continued)

*Primary Examiner* — Adriana Figueroa
(74) *Attorney, Agent, or Firm* — Kenyon & Kenyon LLP

(57) ABSTRACT

The present invention relates to an axially yielding elasto-plastic hysteresis brace including an H-section steel as a steel core, a buckling-restraining member covering an outer periphery of the H-section steel, an unbonded layer filled between the steel core and the buckling-restraining member, and a square steel pipe covering the outer periphery of the buckling-restraining member for reinforcement. For both ends of the H-section steel, one reinforcing plate is welded to each outer surface of each flange so as to be overlapped therewith. The buckling-restraining member is installed so that each reinforcing plate is inserted to the buckling-restraining member through an end thereof by a predetermined length L. And, where the width of the H-section steel as a steel core is given as B and the height thereof is given as H, an insertion length L of each reinforcing plate is set in a range of $2B \leq L \leq 3B$ and also $2H \leq L \leq 3H$.

11 Claims, 7 Drawing Sheets

(56) References Cited

U.S. PATENT DOCUMENTS

| | | | |
|---|---|---|---|
| 6,516,583 B1* | 2/2003 | Houghton | E04B 1/24 |
| | | | 52/167.3 |
| 6,826,874 B2* | 12/2004 | Takeuchi et al. | 52/167.3 |
| 7,174,680 B2* | 2/2007 | Smelser | 52/167.3 |
| 7,225,588 B2* | 6/2007 | Nakamura et al. | 52/167.3 |
| 8,146,322 B2* | 4/2012 | Karns | E04B 1/2403 |
| | | | 52/653.1 |
| 8,590,258 B2* | 11/2013 | Hinchman | 52/741.1 |
| 2010/0005737 A1* | 1/2010 | Tsai et al. | 52/167.3 |
| 2011/0232221 A1* | 9/2011 | Tsai et al. | 52/656.9 |

FOREIGN PATENT DOCUMENTS

| | | |
|---|---|---|
| CN | 101718124 | 6/2010 |
| JP | 56-008768 | 1/1981 |
| JP | 58-156648 | 9/1983 |
| JP | 04-019121 | 4/1992 |
| JP | 06-322818 | 11/1994 |
| JP | 07-324378 | 12/1995 |
| JP | 11-036444 | 2/1999 |
| JP | 2003-343116 | 12/2003 |
| JP | 2005-016163 | 1/2005 |
| JP | 2005-042403 | 2/2005 |
| JP | 2005-220637 | 8/2005 |
| JP | 2011-168984 | 9/2011 |
| JP | 2011-169042 | 9/2011 |
| JP | 2011168984 A * | 9/2011 |
| JP | 2011169042 A * | 9/2011 |

OTHER PUBLICATIONS

Office Action dated Jul. 3, 2015 issued in corresponding CN Application No. 201380040516.2.

Notice of Allowance dated Apr. 5, 2016 issued in corresponding Japanese Application No. 2012-173203 [with English Translation].

* cited by examiner

AXIALLY YIELDING ELASTO-PLASTIC HYSTERESIS BRACE AND VIBRATION-DAMPING STEEL-FRAME STRUCTURE

TECHNICAL FIELD

This application is a national stage application of International Application No. PCT/JP2013/058114, filed on Mar. 21, 2013, which claims priority to Japanese Patent Application No. 2012-173203 filed on Aug. 3, 2012, each of which is incorporated by reference in its entirety.

The present invention relates to an axially yielding elasto-plastic hysteresis brace and a vibration-damping steel-frame structure.

BACKGROUND ART

Patent Document 1 discloses an example of an axially yielding elasto-plastic hysteresis brace. In this brace, a steel core (steel-made central axial-force member) is configured with plates, an outer periphery of the steel core is covered via an unbonded layer (anti-adhesive film) with a concrete buckling-restraining member (buckling-restraining concrete), and an outer periphery of the buckling-restraining member is covered with a steel pipe (steel member), thereby reinforcing the steel core.

In this case, the steel core has a minus (−) type or plus (+) type (cross type) cross-section. An end of the steel core is formed in a cross shape so as to be greater in cross-sectional area and cross-sectional coefficient than a central portion of the steel core in the longitudinal direction in order that the steel core will not undergo plastic deformation by an axial force or is able to resist a bending moment.

CITATION LIST

Patent Document

[Patent Document 1] Japanese Published Unexamined Patent Application No. 2003-343116

SUMMARY OF THE INVENTION

Technical Problem

In the case of a steel core in which a plate 111 is used having a minus (−) type cross-section as shown in FIG. 6A to 6C and also in the case of a steel core in which a main plate 111 is combined with a stiffening plate 112 so as to assume a plus (+) type cross-section as shown in FIG. 7A to 7C, the stiffening plate 112 is joined to the main plate 111 by fillet welding (the reference sign 117 denotes a fillet welded part). Therefore, there is a problem in that the steel core easily develops warping as shown in FIG. 6B and FIG. 7B or it develops torsion and bending as shown in FIG. 6C and FIG. 7C, due to heat on welding. Further, where the steel core which has torsion or warping is joined to a main-body steel frame made of columns and beams, there are problems such as a failure in inserting bolts, etc. Therefore, a jig, etc., is used to suppress development of torsion and warping on fabrication or correction work is performed after welding. In this case, there is a problem in that the fabrication becomes complicated.

With the above-described situation taken into account, an object of the present invention is to provide an axially yielding elasto-plastic hysteresis brace and a vibration-damping steel-frame structure in which a steel core is shaped not only so as to be increased in rigidity but also so as to be less likely to develop torsion or warping on fabrication and the steel core can be fabricated more simply and easily than a conventional steel core.

Solution to Problem

An axially yielding elasto-plastic hysteresis brace of the present invention is provided with a steel core on which an axial force is exerted, a buckling-restraining member which covers an outer periphery of the steel core, with both ends of the steel core in the longitudinal direction being exposed, thereby preventing buckling of the steel core, an unbonded layer which is filled between the steel core and the buckling-restraining member, and a steel pipe which covers the outer periphery of the buckling-restraining member to reinforce the steel core. The steel core is an H-section steel formed of a web and flanges, and for both ends of the H-section steel which are exposed from the buckling-restraining member, one of a plurality of reinforcing plates is welded to each outer surface of each flange so as to be overlapped therewith. Each reinforcing plate is configured to be inserted to the buckling-restraining member through an end thereof by a predetermined length L. And, where the width of the H-section steel is given as B and the height thereof is given as H, the length L is set in a range of 2B≤L≤3B and also 2H≤L≤3H.

Accordingly, as compared with a conventional steel core where steel plates are welded so as to be combined in a cross shape, this steel core can be increased in bending rigidity and torsion rigidity, by which the steel core can be made less likely to develop warping, bending or torsion. Further, for both ends of the H-section steel used as the steel core, one of a plurality of reinforcing plates is welded to each outer surface of each flange so as to be overlapped therewith. And, each reinforcing plate is configured to be inserted to the buckling-restraining member by a predetermined length L. Therefore, it is possible to prevent plastic deformation and buckling of the H-section steel in the vicinity of an end of the buckling-restraining member, while performance as the axially yielding elasto-plastic hysteresis brace is reliably exhibited.

Note that where an insertion amount L of each reinforcing plate to the buckling-restraining member is less than 2B and less than 2H, there is a possibility that the steel core may be largely bent near an end of each reinforcing plate to develop a large bending moment, resulting in a decrease in compression axial force.

Further, the insertion amount L of each reinforcing plate to the buckling-restraining member is set to be in a range not exceeding 3B or 3H. This is to prevent phenomena whereby a part of the H-section steel which undergoes plastic deformation (a part which is not reinforced by the reinforcing plates) is decreased in length and, consequently, ruptured in a smaller number of repetitions due to concentration of strain.

In the axially yielding elasto-plastic hysteresis brace of the present invention, it is preferable that the unbonded layer in contact with the web of the H-section steel be thinner in thickness than the unbonded layer in contact with each flange.

In the H-section steel, the web is thinner than the flanges. Therefore, the web is likely to cause local buckling when a compression axial force is exerted. Therefore, the unbonded layer in contact with the web is made thinner than the unbonded layer in contact with each flange, thus making it possible to avoid local buckling of the web.

Still further, it is preferable that the buckling-restraining member be formed of concrete or mortar.

A vibration-damping steel-frame structure of the present invention is provided with columns, a beam built on the columns to transmit loads to the columns, and the axially yielding elasto-plastic hysteresis brace of the present invention which is installed between the columns and the beam. It is, thereby, possible to increase vibration-damping performance of the steel-frame structure.

Advantageous Effects of Invention

According to the axially yielding elasto-plastic hysteresis brace of the present invention, the steel core is configured with an H-shaped steel and, for both ends of the H-shaped steel, one of the plurality of reinforcing plates is welded to each outer surface of each flange. Consequently, this steel core can be increased in bending rigidity and torsion rigidity and, therefore, is less likely to develop warping, bending or torsion, as compared with a conventional steel core where steel plates are welded so as to be combined in a cross shape.

Therefore, a necessity for fabrication jigs or correction work for suppressing warping, bending, etc., can be eliminated or decreased, and the steel core can be fabricated more easily than a conventional steel core. Further, for both ends of the H-section steel used as the steel core, one reinforcing plate is welded to each outer surface of each flange so as to be overlapped therewith, and each reinforcing plate is configured to be inserted to the buckling-restraining member by a predetermined length L. It is, therefore, possible to prevent plastic deformation and buckling of the H-section steel in the vicinity of an end of the buckling-restraining member, while performance as the axially yielding elasto-plastic hysteresis brace is reliably exhibited.

Further, the unbonded layer in contact with the web is made thinner than the unbonded layer in contact with each flange, thus making it possible to avoid local buckling of the web.

According to the vibration-damping steel-frame structure of the present invention, the axially yielding elasto-plastic hysteresis brace of the present invention is installed between a columns and a beam. It is, thereby, possible to enhance the vibration-damping performance of the steel-frame structure.

DESCRIPTION OF EMBODIMENTS

Hereinafter, a description will be given of the embodiment of the present invention with reference to drawings.

Figure 1:
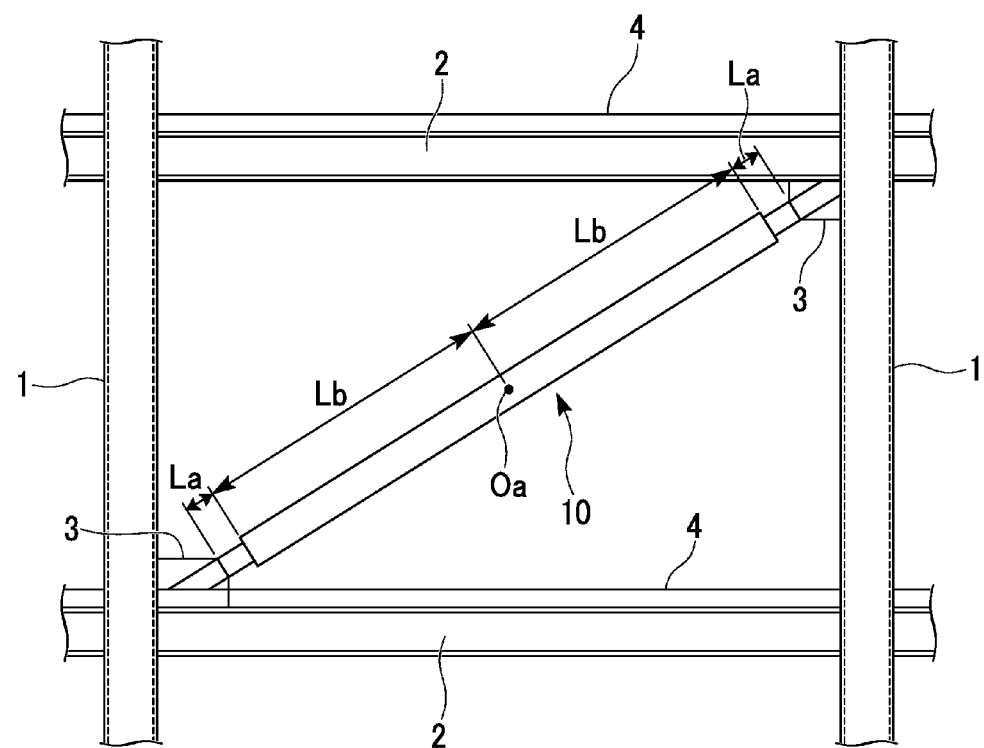
FIG. 1 is a drawing which shows a partial configuration of a vibration-damping steel-frame structure in which an axially yielding elasto-plastic hysteresis brace of an embodiment of the present invention is installed.
Figure 2A:
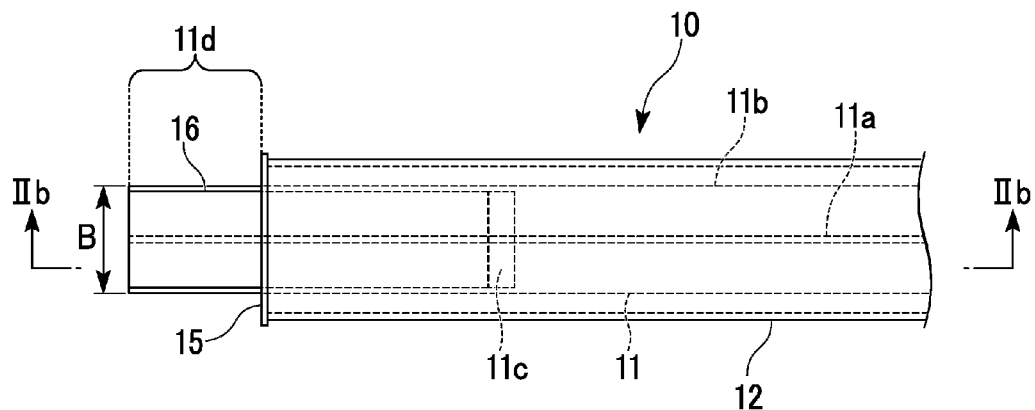
FIG. 2A is a front elevational view which shows the vicinity of an end on one side of the axially yielding elasto-plastic hysteresis brace of the embodiment.
Figure 2B:
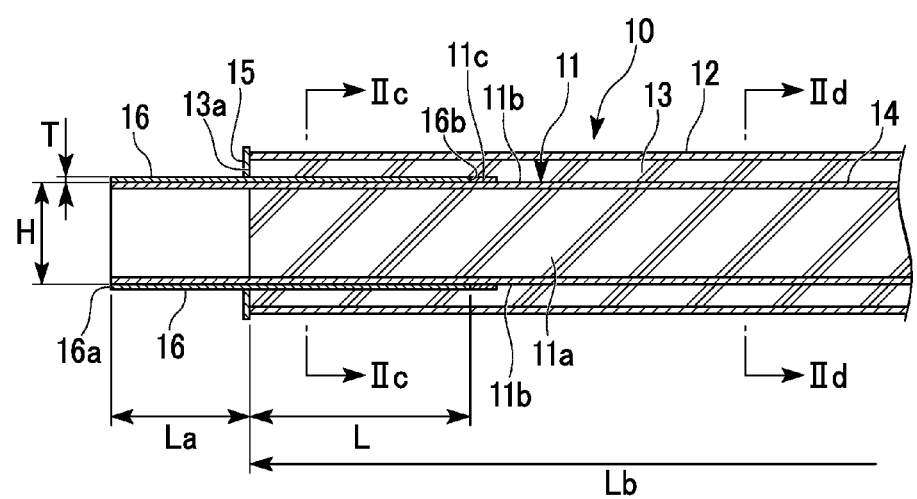
FIG. 2B is an arrow sectional view taken along the line of IIb to IIb in FIG. 2A.
Figure 2C:
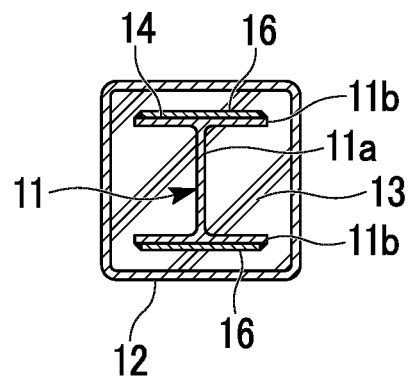
FIG. 2C is an arrow sectional view taken along the line of IIc to IIc in FIG. 2B.
Figure 2D:
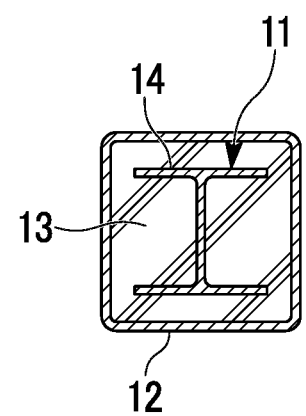
FIG. 2D is an arrow sectional view taken along the line of IId to IId in FIG. 2B.
Figure 3A:
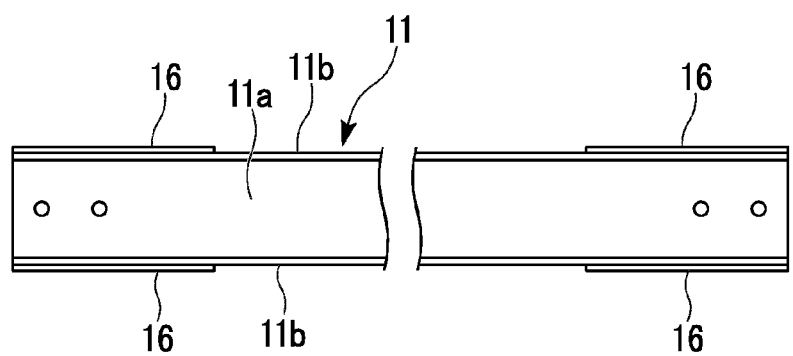
FIG. 3A is a plan view which shows a steel core of the axially yielding elasto-plastic hysteresis brace of the embodiment.
Figure 3B:
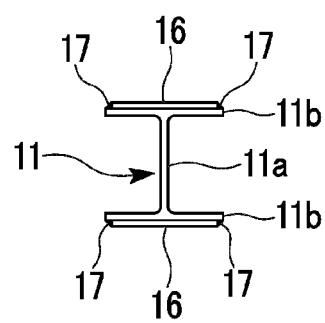
FIG. 3B is a side view which shows the steel core of the axially yielding elasto-plastic hysteresis brace of the embodiment.
Figure 3C:
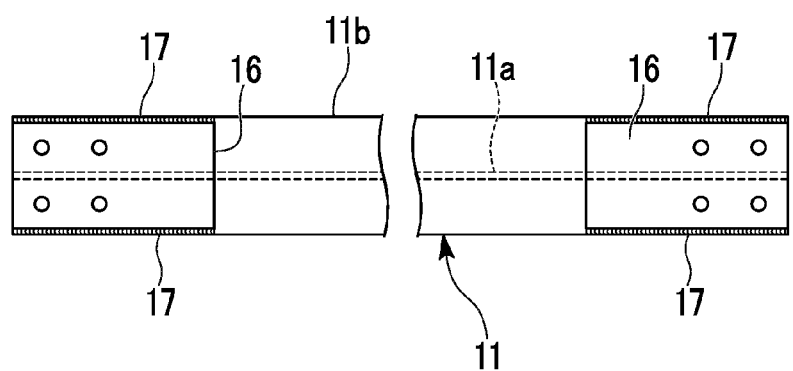
FIG. 3C is a front elevational view which shows the steel core of the axially yielding elasto-plastic hysteresis brace of the embodiment.

FIG. 1 is a drawing which shows a partial configuration of the vibration-damping steel-frame structure in which the axially yielding elasto-plastic hysteresis brace of the embodiment is installed. FIG. 2A is a front elevational view which shows the vicinity of an end on one side of the axially yielding elasto-plastic hysteresis brace. FIG. 2B is an arrow sectional view taken along the line of IIb to IIb in FIG. 2A. FIG. 2C is an arrow sectional view taken along the line of IIc to IIc in FIG. 2B. FIG. 2D is an arrow sectional view taken along the line of IId to IId in FIG. 2B. FIG. 3A is a plan view which shows a steel core of the axially yielding elasto-plastic hysteresis brace. FIG. 3B is a side view and FIG. 3C is a front elevational view of the steel core of the axially yielding elasto-plastic hysteresis brace.

In the vibration-damping steel-frame structure as shown in FIG. 1, an axially yielding elasto-plastic hysteresis brace 10 of the present embodiment is diagonally installed in a framework which assumes a rectangular shape by columns 1 and a beam 2 which is built on the columns to transmit loads to the columns and is joined via gusset plates 3 to corner portions at which the columns 1 is joined to the beam 2 by using bolts or welding (not illustrated). Note that in FIG. 1 reference sign 4 denotes a floor slab.

As shown in FIG. 2A to FIG. 2D, the axially yielding elasto-plastic hysteresis brace 10 is provided with an H-section steel 11 which is a steel core on which an axial force is exerted, a buckling-restraining member 13 which is formed of mortar and concrete aggregate or mortar and which covers an outer periphery of the H-section steel 11 via an unbonded layer 14, with both ends of the H-section steel 11 in the longitudinal direction being exposed, and a square steel pipe 12 which covers and reinforces the outer periphery of the buckling-restraining member 13. The buckling-restraining member 13 and the square steel pipe 12 are to prevent buckling at an intermediate part of the H-section steel 11 in the longitudinal direction. The buckling-restraining member 13 is filled into a space between the square steel pipe 12 and the H-section steel 11. And, openings at both ends of the square steel pipe 12 are closed by a steel lid member 15 in order that concrete or mortar injected from the end of the square steel pipe 12 will not leak out after the concrete or the mortar has been filled.

The unbonded layer 14 is formed as an anti-adhesive film made of a viscoelastic material such as butyl rubber, for example. Materials other than butyl rubber include viscoelastic plastic, natural rubber, polyisoprene, polybutadiene, styrene-butadiene rubber, ethylene-propylene rubber, polychloroprene, polyisobutylene, asphalt, paints and a mixture thereof.

Figure 4:
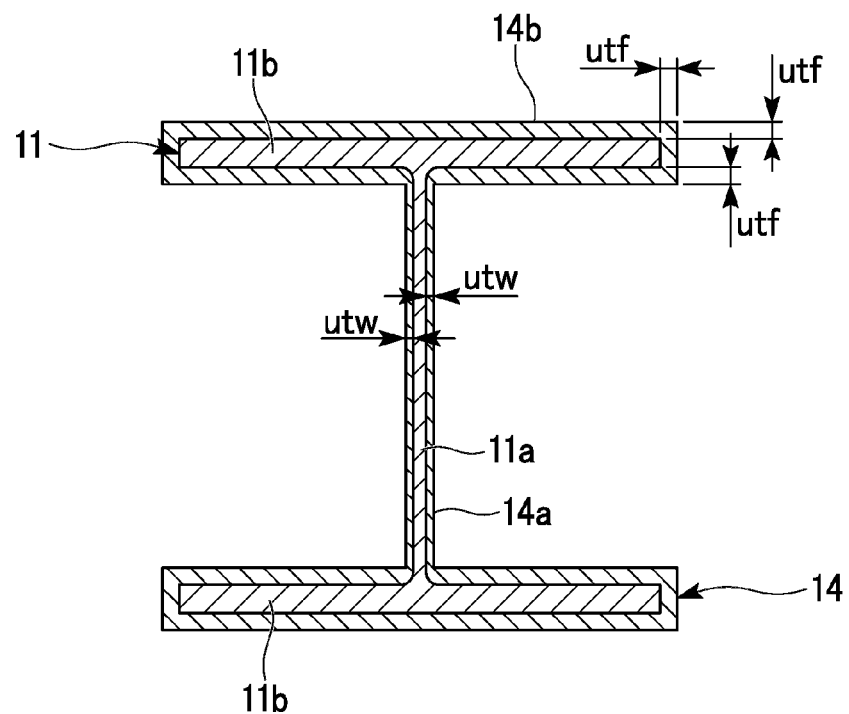
FIG. 4 is a block diagram which shows the steel core of the axially yielding elasto-plastic hysteresis brace of the embodiment and also a sectional view which shows the thickness of an unbonded layer.

In this case, as shown in FIG. 2A to 2D and FIG. 3A to 3C, the H-section steel 11 used as a steel core is formed of a web 11a and flanges 11b. For both ends 11d (hereinafter, simply referred to as ends 11d) of the H-section steel 11 which are exposed from the buckling-restraining member 13, the square steel pipe 12 and the steel lid member 15, one of a plurality of reinforcing plates 16 which is slightly smaller in width than the flanges 11b is overlapped on each outer surface of each flange 11b (a surface in opposition to a surface connected to the web 11a), and integrally joined to each flange 11b by fillet welding (the reference sign 17 denotes a fillet welded part thereof). Accordingly, both the ends 11d of the steel core are increased in cross-sectional area and cross-sectional coefficient. Here, the thickness T of each reinforcing plates 16 is set so as to be substantially equal to the thickness of the flange 11b of the H-section steel. Further, as shown in FIG. 4, the thickness (utw) of an unbonded layer 14a (around the web 11a) in contact with the web 11a of the H-section steel 11 is made thinner than the thickness (utf) of an unbonded layer 14b in contact with each flange 11b (around each flange 11b).

The reinforcing plates 16 are arranged on flanges 11b in the same longitudinal direction as the H-section steel 11, and formed so as to cover the length from an end of the H-section steel 11 to the inside of the buckling-restraining member 13. That is, each reinforcing plate 16 is inserted to the buckling-restraining member 13 through an end thereof (a position of the steel lid member 15) by a predetermined length to be described later.

More specifically, one end 16a of the reinforcing plate 16 is arranged at a position which is in agreement with an end 11d of the H-section steel 11. Further, the length of the reinforcing plate 16 is longer than the length of the H-section steel 11 protruding from an end surface 13a of the buckling-restraining member 13. Therefore, the other end 16b of the reinforcing plate 16 is arranged so as to be inserted to the buckling-restraining member 13 (between the flange 11b of the H-section steel 11 and the buckling-restraining member 13). That is, the other end 16b of the reinforcing plate 16 is positioned inside the buckling-restraining member 13 and the square steel pipe 12. Note that reference sign 11c in FIG. 2A and FIG. 2B denotes a cushioning material.

Here, the length of each reinforcing plate 16 which is overlapped on the buckling-restraining member 13 in the longitudinal direction (a distance between the end surface 13a of the buckling-restraining member 13 and an end surface on the side of the other end 16b of the reinforcing plate 16) is given as L. And, where the width of the H-section steel protruding from the end surface 13a of the buckling-restraining member 13 (the length of the flange 11b in a direction perpendicular to the web 11a) is given as B, the height (the length between the outer surfaces of the flange 11b) is given as H, and the length from the end surface 13a of the buckling-restraining member 13 to a midpoint Oa of the H-section steel 11 in the longitudinal direction (refer to FIG. 1) is given as Lb, the length L is set in a range of $2B \leq L$ and also $2H \leq L$.

Further, the length L is set in a range of $L \leq 3B$ and also $L \leq 3L$.

Still further, the length La of the H-section steel protruding from the end surface 13a of the buckling-restraining member 13 is set in a range of $B \leq La \leq 2.5B$ in relation to the width B of the H-section steel 11.

Where the length La of the H-section steel 11 protruding from the end surface 13a of the buckling-restraining member 13 is made no more than B, the length La is too short in joining the axially yielding elasto-plastic hysteresis brace 10 to the gusset plates 3 at which the columns 1 are joined with the beam 2 by using joining means such as bolts, etc. As a result, joining work cannot be performed in practice.

Further, where the length La of the H-section steel 11 protruding from the end surface 13a of the buckling-restraining member 13 is made 2.5B or more, the protruding amount of the H-section steel 11 from the buckling-restraining member 13 becomes excessively long, resulting in insufficient strength of a protrusion part of the H-section steel 11. Thus, defects are found such that the part may have plastic deformation or buckling when subjected to an axial force.

As described so far, according to the axially yielding elasto-plastic hysteresis brace of the present invention, the H-section steel is used as a steel core. Thereby, this steel core can be increased in bending rigidity and torsion rigidity, as compared with a conventional steel core where steel plates are welded so as to be combined in a cross shape and welded together. Thus, the steel core can be made less likely to develop warping, bending or torsion.

Further, for both ends 11d of the H-section steel 11 used as a steel core, one reinforcing plate 16 is welded to each outer surface of each flange 11b so as to be overlapped therewith, and each reinforcing plate 16 is inserted to the buckling-restraining member 13 by a predetermined length L. Still further, the insertion amount L of each reinforcing plate 16 to the buckling-restraining member is set in a range of $2B \leq L \leq 3B$ and also $2H \leq L \leq 3H$. Therefore, it is possible to prevent plastic deformation and buckling of the H-section steel 11 in the vicinity of an end of the buckling-restraining member 13, while performance as the axially yielding elasto-plastic hysteresis brace 10 is reliably exhibited.

That is, it is possible to avoid phenomena whereby the steel core is largely bent in the vicinity of an end of the reinforcing plate 16, developing a large bending moment and resulting in a decrease in compression axial force. It is also possible to avoid phenomena whereby a part of the H-section steel 11 which undergoes plastic deformation (a part which is not reinforced by the reinforcing plate 16) is decreased in length and, consequently, ruptured in a smaller number of repetitions due to concentration of strain.

Further, in the above-described embodiment, the thickness (utw) of the unbonded layer 14a in contact with the web 11a is made thinner than the thickness (utf) of the unbonded layer 14b in contact with each flange 11b. It is, thereby, possible to avoid local buckling of the web 11a.

Figure 5:
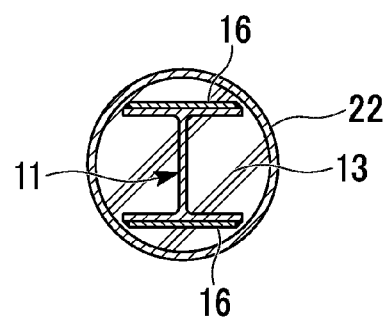
FIG. 5 is a sectional view which corresponds to FIG. 2C where a round steel pipe is used as a steel pipe of the axially yielding elasto-plastic hysteresis brace.
Figure 6A:
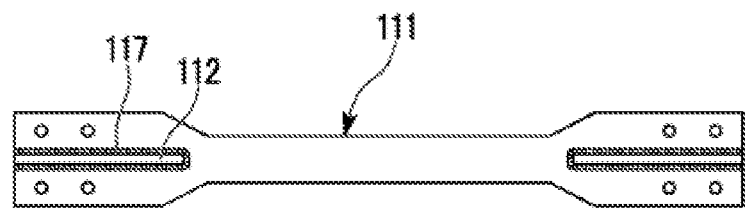
FIG. 6A is a plan view which shows a problem when a steel core having a minus (−) type cross-section is used as a steel core of a conventional type of an axially yielding elasto-plastic hysteresis brace.
Figure 6B:
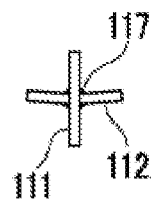
FIG. 6B is a side view which shows a case where the steel core given in FIG. 6A has developed warping by welding.
Figure 6C:
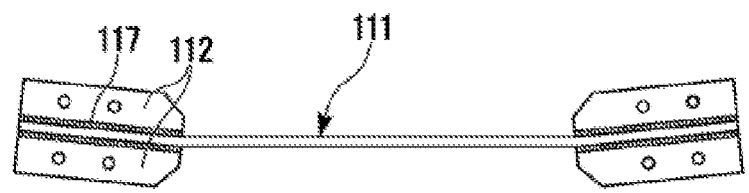
FIG. 6C is a front elevational view which shows a case where the steel core given in FIG. 6A has developed bending by welding.
Figure 7A:
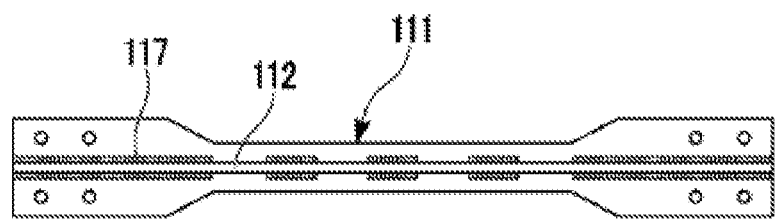
FIG. 7A is a plan view which shows a problem where a steel core having a plus (+) type cross-section is used as a steel core of a conventional type of an axially yielding elasto-plastic hysteresis brace.
Figure 7B:
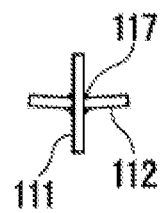
FIG. 7B is a side view which shows a case where the steel core given in FIG. 7A has developed warping by welding.
Figure 7C:
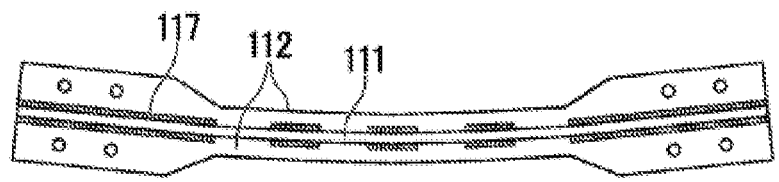
FIG. 7C is a front elevational view which shows a case where the steel core given in FIG. 7A has developed torsion and bending by welding.

In the above-described embodiment, a case is shown where the square steel pipe 12 is used as a steel pipe which covers an outer periphery of the buckling-restraining member 13. It is, however, acceptable that as shown in FIG. 5, in place of the square steel pipe, a round steel pipe 22 may be used or a steel pipe having another cross-sectional shape may be used.

INDUSTRIAL APPLICABILITY

In the axially yielding elasto-plastic hysteresis brace of the present invention, an outer periphery of the H-section steel as a steel core is covered via the unbonded layer with buckling-restraining concrete or a mortar member (buckling-restraining member) and the outer periphery of the buckling-restraining member is also covered with a square steel pipe, by which the H-section steel is reinforced. For both ends of the H-section steel, one reinforcing plate is welded to each outer surface of each flange so as to be overlapped therewith, and the buckling-restraining member is installed so that each reinforcing plate is inserted to the buckling-restraining member through an end thereof by a predetermined length L. Then, where the width of the H-section steel is given as B and the height thereof is given as H, the insertion length L of each reinforcing plate is set in a range of $2B \leq L \leq 3B$ and also $2H \leq L \leq 3H$.

According to the above-described axially yielding elasto-plastic hysteresis brace of the present invention, the steel core can be increased in rigidity. And, when a steel core is fabricated, the steel core is formed in such a shape that is less likely to develop torsion and warping, by which the steel core can be fabricated more easily than a conventional steel core.

REFERENCE SIGNS LIST

10: axially yielding elasto-plastic hysteresis brace
11: H-section steel (steel core)
12: square steel pipe
13: buckling-restraining concrete or mortar member (buckling-restraining member)
14: unbonded layer
utw: thickness of unbonded layer in contact with web
utf: thickness of unbonded layer in contact with each flange
16: reinforcing plate
22: round steel pipe

The invention claimed is:

1. An axially yielding elasto-plastic hysteresis brace, comprising:
    a steel core on which an axial force is exerted;
    a buckling-restraining member which covers an outer periphery of the steel core, with both ends of the steel core in the longitudinal direction being exposed, thereby preventing buckling of the steel core;
    an unbonded layer which is filled between the steel core and the buckling-restraining member;
    a steel pipe which covers the outer periphery of the buckling-restraining member to reinforce the steel core; and
    reinforcing plates, wherein
    the steel core is an H-section steel which is formed of a web and flanges and has a uniform section from one end to the other end of the H-section steel,
    for both ends of the H-section steel which are exposed from the buckling-restraining member, one reinforcing plate is welded to each outer surface of each flange so that a whole plate surface of the reinforcing plate overlaps the outer surface of the flange,
    each reinforcing plate is configured to be inserted to the buckling-restraining member through an end thereof by a predetermined length L, and
    where the width of the H-section steel is given as B and the height thereof is given as H, the length L is set in a range of $2B \leq L \leq 3B$ and also $2H \leq L \leq 3H$.

2. The axially yielding elasto-plastic hysteresis brace according to claim 1, wherein the thickness of the unbonded layer in contact with the web of the H-section steel is thinner than the thickness of the unbonded layer in contact with each flange.

3. The axially yielding elasto-plastic hysteresis brace according to claim 1, wherein the buckling-restraining member is formed of concrete or mortar.

4. A vibration-damping steel-frame structure, comprising:
    columns;
    a beam built on the columns to transmit loads to the columns; and
    the axially yielding elasto-plastic hysteresis brace according to claim 1 which is installed between the columns and the beam.

5. The axially yielding elasto-plastic hysteresis brace according to claim 2, wherein the buckling-restraining member is formed of concrete or mortar.

6. A vibration-damping steel-frame structure, comprising:
    columns;
    a beam built on the columns to transmit loads to the columns; and
    the axially yielding elasto-plastic hysteresis brace according to claim 2 which is installed between the columns and the beam.

7. A vibration-damping steel-frame structure, comprising:
    columns;
    a beam built on the columns to transmit loads to the columns; and
    the axially yielding elasto-plastic hysteresis brace according to claim 3 which is installed between the columns and the beam.

8. A vibration-damping steel-frame structure, comprising:
    columns;
    a beam built on the columns to transmit loads to the columns; and
    the axially yielding elasto-plastic hysteresis brace according to claim 5 which is installed between the columns and the beam.

9. The axially yielding elasto-plastic hysteresis brace according to claim 1, wherein a length La of the H-section steel protruding from the end surface of the buckling-restraining member is set in a range of $B < La < 2.5B$.

10. The axially yielding elasto-plastic hysteresis brace according to claim 1, further comprising:
    a steel lid member closing the opening at the both ends of the steel pipe.

11. The axially yielding elasto-plastic hysteresis brace according to claim 1, wherein one end of each of the reinforcing plate is arranged at a position which is in agreement with the end of each of the flanges.

* * * * *